(12) United States Patent
Lorenz et al.

(10) Patent No.: US 8,957,891 B2
(45) Date of Patent: Feb. 17, 2015

(54) ANATOMY-DEFINED AUTOMATED IMAGE GENERATION

(75) Inventors: Cristian Lorenz, Hamburg (DE); Tobias Klinder, Uelzen (DE)

(73) Assignee: Koninklijke Philips N.V., Eindhoven (NL)

( * ) Notice: Subject to any disclaimer, the term of this patent is extended or adjusted under 35 U.S.C. 154(b) by 228 days.

(21) Appl. No.: 13/120,188

(22) PCT Filed: Sep. 18, 2009

(86) PCT No.: PCT/IB2009/054099
§ 371 (c)(1),
(2), (4) Date: Mar. 22, 2011

(87) PCT Pub. No.: WO2010/035196
PCT Pub. Date: Apr. 1, 2010

(65) Prior Publication Data
US 2011/0175909 A1   Jul. 21, 2011

(30) Foreign Application Priority Data
Sep. 26, 2008  (EP) ..................................... 08165261

(51) Int. Cl.
*G06T 15/00* (2011.01)
*G06T 15/08* (2011.01)
(52) U.S. Cl.
CPC ............. *G06T 15/08* (2013.01); *G06T 2210/41* (2013.01)
USPC ...................................................... 345/419
(58) Field of Classification Search
USPC ....................................................... 345/419
See application file for complete search history.

(56) References Cited

U.S. PATENT DOCUMENTS

| 7,061,484 B2 * | 6/2006 | Bailey et al. .................. 345/419 |
| 2005/0148852 A1 | 7/2005 | Tank |
| 2006/0165268 A1 | 7/2006 | Kaus et al. |
| 2010/0239140 A1 * | 9/2010 | Ruijters et al. ................ 382/130 |

FOREIGN PATENT DOCUMENTS

WO   9641567 A2   12/1996

OTHER PUBLICATIONS

Vrtovec, Tomaž, Boštjan Likar, and Franjo Pernuš. "Automated curved planar reformation of 3D spine images." Physics in medicine and biology 50.19 (2005): 4527.*

(Continued)

*Primary Examiner* — David Zarka
*Assistant Examiner* — Vu Nguyen

(57) ABSTRACT

A system for visualizing an object in image data using a first cross-section surface coupled to a model of the object, the system comprising a model unit for adapting a model to the object in the image data, a surface unit for adapting the first cross-section surface to the adapted model on the basis of the coupling between the first cross-section surface and the model, and a visualization unit for computing an image from the image data on the basis of the adapted first cross-section surface. The first cross-section surface may be used to define a slice of the image data for visualizing useful features of the object. Advantageously, adapting the model to the object in the image data and the coupling between the first cross-section surface and the model enable the first cross-section surface to be adapted to the image data. Thus, the shape, orientation and/or position of the adapted first cross-section surface is/are based on the shape, orientation and/or position of the adapted model.

12 Claims, 7 Drawing Sheets

(56) References Cited

OTHER PUBLICATIONS

Lee, Noah, and Matthias Rasch. "Tangential curved planar reformation for topological and orientation invariant visualization of vascular trees." Engineering in Medicine and Biology Society, 2006. EMBS'06. 28th Annual International Conference of the IEEE. IEEE, 2006.*

Frank, R. J., H. Damasio, and T. J. Grabowski. "Brainvox: an interactive, multimodal visualization and analysis system for neuroanatomical imaging." Neuroimage 5.1 (1997): 13-30.*

Yoshioka, Naoki, et al. "Bezier surface reformation: an original visualization technique of cervical nerve roots on myelographic CT." Radiation medicine 24.8 (2006): 600-604.*

Connor et al: "The Contribution of High-Resolution Multiplanar Reformats of the Skull Base to the Detection of Skull-Base Fractures"; Clinical Radiology, 2005, vol. 60, pp. 878-885.

Ney et al: "Editing Tools for 3D Medical Imaging"; IEEE Computer Graphics and Applications, Nov. 1991, pp. 63-72.

Bullitt et al: "Volume Rendering of Segmented Image Objects"; IEEE Transactions on Medical Imaging, Aug. 2002, vol. 21, No. 8, pp. 998-1002.

Haubner et al: "Virtual Reality in Medicine—Computer Graphics and Interaction Techniques"; IEEE Transactions on Information Technology in Biomedicine, Mar. 1997, vol. 1, No. 1, pp. 61-73.

Klinder et al: "Automated Model-Based Rib Cage Segmentation and Labeling in CT Images"; MICCAI 2007, LNCS 4792, pp. 195-202.

Kanitsar et al: "CPR—Curved Planar Reformation"; IEEE Conference on Visualization 2002, Session P1: Medical Visualization, pp. 37-44.

Yoshioka, N. et al. "Bezier surface reformation: an original visualization technique of cervical nerve roots on myelographic CT", Radiation Medicine, Springer-Verlag, vol. 24, No. 1, (2006), pp. 600-604.

Lu, X. et al. "B-spline based curved planar reformation of medical volume data", Journal of Information and Computational Science, Mar. 2008, Sun Yat-Sen (Zhongshan) University, CN, vol. 5, No. 2, Mar. 2008, pp. 545-552.

Saroul, L. et al. "Exploring curved anatomic structures with surface sections", IEEE Visualization 2003, Proceedings, Seattle, WA, Oct. 19-24, 2003, NY, NY, pp. 27-34.

* cited by examiner

ANATOMY-DEFINED AUTOMATED IMAGE GENERATION

FIELD OF THE INVENTION

The invention relates to visualization of structures in medical images using a technique known as curved planar reformation and, in particular, to defining a cross-section surface for visualizing an object in image data.

BACKGROUND OF THE INVENTION

For 3-dimensional (3D) or 4-dimensional (4D) image data, a projection function that performs the mapping onto a 2-dimensional (2D) viewing plane of the display is needed. Common visualization techniques include displaying of planar cuts through (i.e. cross-sections of) the image data, projection techniques such as the maximum intensity projections (MIP) and volume rendering techniques based on transfer functions. Other techniques are planar and multiplanar reformats (MPR) described, e.g., in S. E. J. Connor and C. Flis, "The contribution of high-resolution multiplanar reformats of the skull base to the detection of skull-base fractures", Clinical Radiology, Volume 60, Issue 8, 2005, Pages 878-885, and their generalization—curved planar reformation (CPR)—described, e.g., in Armin Kanitsar, Dominik Fleischmann, Rainer Wegenkittl, Petr Felkel, and Meister Eduard Gröller, CPR—curved planar reformation, Proceedings of the conference on Visualization '02 Boston, Mass., SESSION: Session P1: medical visualization Pages: 37-44 (also available at http://www.cg.tuwien.ac.at/research/publications/2002/kanitsar-2002-CPRX/TR-186-2-02-06 Paper.pdf), hereinafter referred to as Ref. 1. The goal of CPR is to make a tubular structure visible in its entire length within a single image. To this end, the centerline of the structure is obtained. The centerline and an arbitrary vector of interest selected by the user determine a re-sampling surface, as described in the introduction to section 3 CPR Methods of Ref. 1. The re-sampled data may be visualized using a projected CPR, stretched CPR or straightened CPR, as described in, respectively, section 3.1, 3.2, or 3.3 of Ref. 1.

The problem of the method described in Ref. 1 is that it is based on the centerline determination and thus the method is designed specifically for tubular structures and cannot be easily adapted for visualizing other objects such the human heart or brain.

SUMMARY OF THE INVENTION

It would be advantageous to have a system that is capable of defining a cross-section surface for visualizing an object in image data, which object is a non-tubular object.

Thus, in an aspect of the invention, a system for visualizing an object in image data using a first cross-section surface coupled to a model of the object is provided, the system comprising:

a model unit for adapting the model to the object in the image data;

a surface unit for adapting the first cross-section surface to the adapted model on the basis of the coupling between the first cross-section surface and the model; and a visualization unit for computing an image from the image data on the basis of the adapted first cross-section surface.

The first cross-section surface may be used to define a slice of the image data for visualizing useful features of the object. Any suitable rendering technique, e.g. maximum intensity projection (MIP), can be used by the visualization unit to compute the image based on the slice of the image data defined by the first cross-section surface. Because the first cross-section surface of the invention is coupled to the model, the position, orientation and/or shape of the surface is determined by the model adapted to the object in the image data. Advantageously, adapting the model to the object in the image data and the coupling between the first cross-section surface and the model enable the first cross-section surface to be adapted to the image data. Thus, the shape, orientation and/or position of the adapted first cross-section surface is/are based on the shape, orientation and/or position of the adapted model. Adapting the first cross-section surface directly to the object based on features in the image data to achieve a similar effect would be less reliable and less accurate because the surface comprises fewer features of the object than the model.

In an embodiment, the system is further arranged for using a second cross-section surface coupled to the model of the object, wherein:

the surface unit is further arranged for adapting the second cross-section surface to the adapted model on the basis of the coupling between the second cross-section surface and the model; and the image computed from the image data by the visualization unit is further based on the adapted second cross-section surface.

Thus, the shape, orientation and/or position of the adapted second cross-section surface is also based on the shape, orientation and/or position of the adapted model and hence, indirectly, on the image data.

In an embodiment of the system, the first cross-section surface is rigid and is movably coupled to the model. For example, the surface may be a rectangle and the plane of the rectangle may be defined by three non co-linear points defined by features of the model. The surface unit may be arranged for adapting the rectangle to the model such that (i) the plane of the rectangle is determined by the three points of the adapted model, (ii) the center of the rectangle is determined by the mass center of the three points, and (iii) an axis of the rectangle is determined by the line obtained from linear regression to the three points of the adapted model.

In an embodiment of the system, the first cross-section surface is elastic. For example, the surface may be implemented as a surface mesh comprising a plurality of nodes. The neighboring nodes may interact with each other via elastic forces. Elastic forces are easy to implement and compute. Further, elastic forces will (?) describe expected deformation of the surface resulting from the deformation of the model of the object. However, a person skilled in the art will appreciate that in an alternative embodiment, some nodes may interact with each other via non-elastic forces.

In an embodiment of the system, the first cross-section surface comprises a plurality of control points which are rigidly or elastically coupled to the model. For example, the positions of the plurality of control points may be based on features of the model. In the case of rigid coupling, the coordinates of the control points are fixed with respect to the model. In the case of elastic coupling, the positions of the plurality of control points are determined by their elastic interaction with the model. The elastic interaction may be described by elastic forces such as harmonic forces. The surface may be defined by the control points using, e.g., interpolation techniques. The skilled person will understand that, using non-elastic coupling is also possible.

In a further aspect of the invention, the system is comprised in a reporting system for creating a report, the report comprising the image computed from the image data by the visualization unit, on the basis of the adapted first cross-section surface.

In a further aspect of the invention, the system is comprised in an image acquisition apparatus.

In a further aspect of the invention, the system is comprised in a workstation.

In a further aspect of the invention, a method of visualizing an object in image data using a first cross-section surface coupled to a model of the object is provided, the method comprising:

a model step for adapting the model to the object in the image data;

a surface step for adapting the first cross-section surface to the adapted model on the basis of the coupling between the first cross-section surface and the model; and a visualization step for computing an image from the image data on the basis of the adapted first cross-section surface.

In a further aspect of the invention, a computer program product to be loaded by a computer arrangement is provided, the computer program product comprising instructions for visualizing an object in image data using a first cross-section surface coupled to a model of the object, the computer arrangement comprising a processing unit and a memory, the computer program product, after being loaded, providing said processing unit with the capability to carry out the tasks of:

adapting the model to the object in the image data;

adapting the first cross-section surface to the adapted model on the basis of the coupling between the first cross-section surface and the model; and computing an image from the image data on the basis of the adapted first cross-section surface.

It will be appreciated by those skilled in the art that two or more of the above-mentioned embodiments, implementations, and/or aspects of the invention may be combined in any way deemed useful.

Modifications and variations of the reporting system, of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., to 3-dimensional or 4-dimensional images, acquired by various acquisition methods such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF THE EMBODIMENTS

Figure 1:
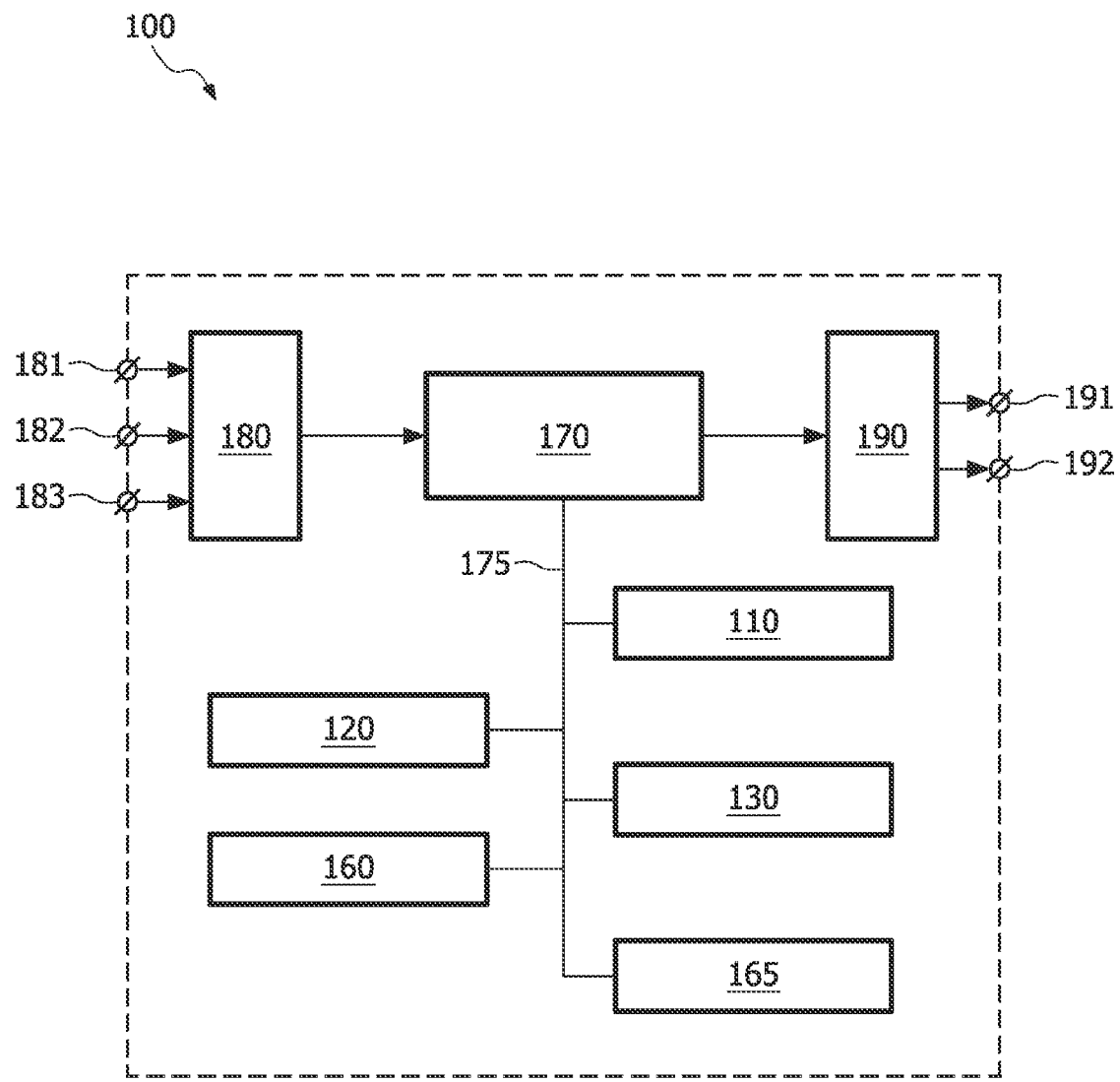
FIG. 1 schematically shows a block diagram of an exemplary embodiment of the system.

FIG. 1 schematically shows a block diagram of an exemplary embodiment of the system 100 for visualizing an object in image data using a first cross-section surface coupled to a model of the object, the system comprising:

a model unit 110 for adapting the model to the object in the image data;

a surface unit 120 for adapting the first cross-section surface to the adapted model on the basis of the coupling between the first cross-section surface and the model; and a visualization unit 130 for computing an image from the image data on the basis of the adapted first cross-section surface.

The exemplary embodiment of the system 100 further comprises the following units:

a control unit 160 for controlling the workflow in the system 100;

a user interface 165 for communicating with a user of the system 100; and a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the image data. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the image computed from the image data on the basis of the adapted first cross-section surface. The memory unit 170 may be also arranged to receive data from and/or deliver data to the units of the system 100 comprising the model unit 110, the surface unit 120, the visualization unit 130, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

Alternatively, the system 100 may comprise no memory unit 170 and no memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a control unit 160 for controlling the workflow in the system 100. The control unit may be arranged to receive control data from and provide control data to the units of the system 100. For example, after adapting the model to the object in the image data, the model unit 110 may be arranged to provide control data "the model being adapted" to the control unit 160 and the control unit 160 may be arranged to provide control data "adapting the first cross-section surface to the model" to the surface unit 120. Alternatively, a control function may be implemented in a unit of the system 100.

In an embodiment of the system 100, the system 100 comprises a user interface 165 for communicating with the user of the system 100. The user interface 165 may be arranged to receive a user input for selecting a model and/or a first or second cross-section surface coupled to the model. The user interface may also provide the user with information, e.g., it may display the image computed from the image data on the basis of the adapted first cross-section surface. Optionally, the user interface may receive a user input for selecting a mode of operation of the system such as, e.g., for selecting coupling forces for coupling the first cross-section surface to the model. A person skilled in the art will understand that more functions may be advantageously implemented in the user interface 165 of the system 100.

In an embodiment, the system 100 is employed to visualize vertebrae of the spinal column of a patient. The adaptation unit 110 is arranged for employing a spinal column model comprising a plurality of deformable mesh models of individual vertebrae and for adapting the mesh models of individual vertebrae to vertebrae of a spinal column object in CT image data of the patient. A model for segmenting the spinal column is described, for example, in Tobias Klinder, Cristian Lorenz, Jens von Berg, Sebastian P. M. Dries, Thomas Bülow, Jörn Ostermann: *Automated Model-Based Rib Cage Segmentation and Labeling in CT Images*, MICCAI (2) 2007: pp 195-202.

Figure 2:
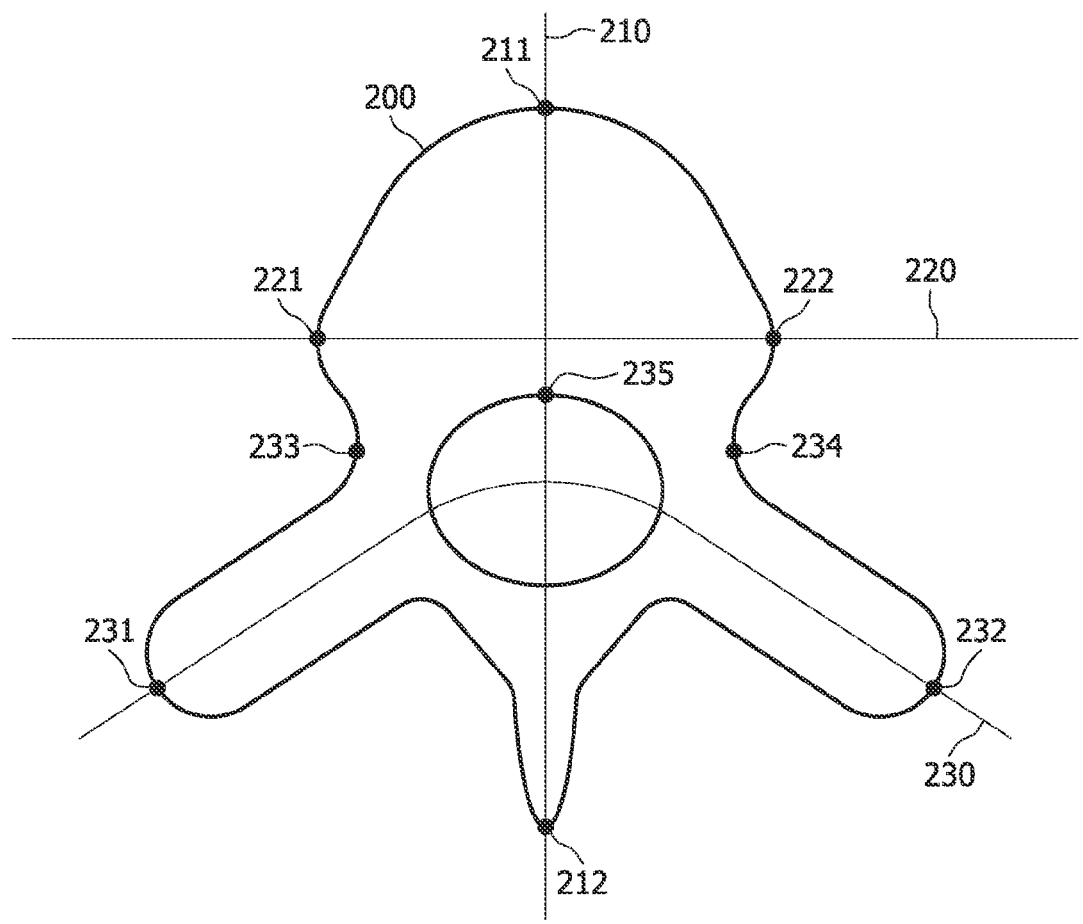
FIG. 2 illustrates a few exemplary cross-section surfaces defined with respect to the spinal column model.

The surface unit 120 is arranged for adapting a first and second cross-section surface to the adapted model. Since the spinal column model is substantially symmetric, the first cross-section surface may be the symmetry plane of the spinal column. Alternatively, the first cross-section surface is defined by control points. FIG. 2 illustrates a few exemplary cross-section surfaces defined with respect to the spinal column model on the basis of control points located on each vertebra of the model. FIG. 2 shows a cross-section 200 of a vertebra by a plane substantially perpendicular to the spinal cord centerline and crossing the vertebral body substantially in the middle of its height. A plurality of such vertebral cross-sections, one vertebral cross-section 200 of the plurality of vertebral cross-sections defined for each vertebra of the model, is used to define vertebral cross-section surfaces. The first cross-section surface 210 is defined by a pair of control points 211 and 212 on each vertebral cross-section 200. The fist control point 211 is located at the top of the vertebral body and the second control point 212 is located at the tip of the spinous process. The second cross-section surface 220 is perpendicular to the first cross-section surface 210 and is defined by two control points 221 and 222 on each vertebral cross-section at positions which are most distant from the first cross-section surface, one point on the left side and one point on the right side of the vertebral body. The distance between the second cross-section surface and the first control point 221 is the same as the distance between the second cross-section surface and the second control point 222. The third cross-section surface 230 is also perpendicular to the first cross-section surface 210 and is defined by five control points 231, 232, 233, 234 and 235 on each vertebral cross-section. Two control points 231 and 232 are located substantially at the tips of the transverse processes. These two points are on the cross-section surface. Two control points 233 and 234 are located at opposite positions on each vertebral cross-section which are least distant from the vertebral foramen, one point on the left pedicle and the other point on the right pedicle. These two points are arranged to attract the third cross section surface. The last control point 235 is located on the vertebral foramen and is arranged to repulse the section surface 230.

In an embodiment, each cross-section surface is elastic. The minimum elastic energy corresponds to a flat cross section surface. The control points 211, 212, 221, 222, 231 define some surface constraints. These points can freely slide in their respective cross-section surfaces. The interaction between the third cross-section surface and each of the control points 233 and 234 is based on a potential dependent on the square of the distance between each point and the third cross-section surface. The interaction between the third cross-section surface and the control point 235 is based on a potential inversely proportional to the distance between this point and the third cross-section surface. The cross-section surface corresponds to the minimum of the total potential energy.

After an adaptation of the model by the model unit 110, new positions of the control points on the adapted vertebra models are found. The surface unit 120 computes the cross-section surface based on these new positions of the control points and the total potential energy, thereby creating adapted cross-section surfaces corresponding to the minimum potential energy. The adapted cross-section surfaces allow visualizing individual characteristics of the patient's vertebral column by the visualization unit 130.

Figure 3:
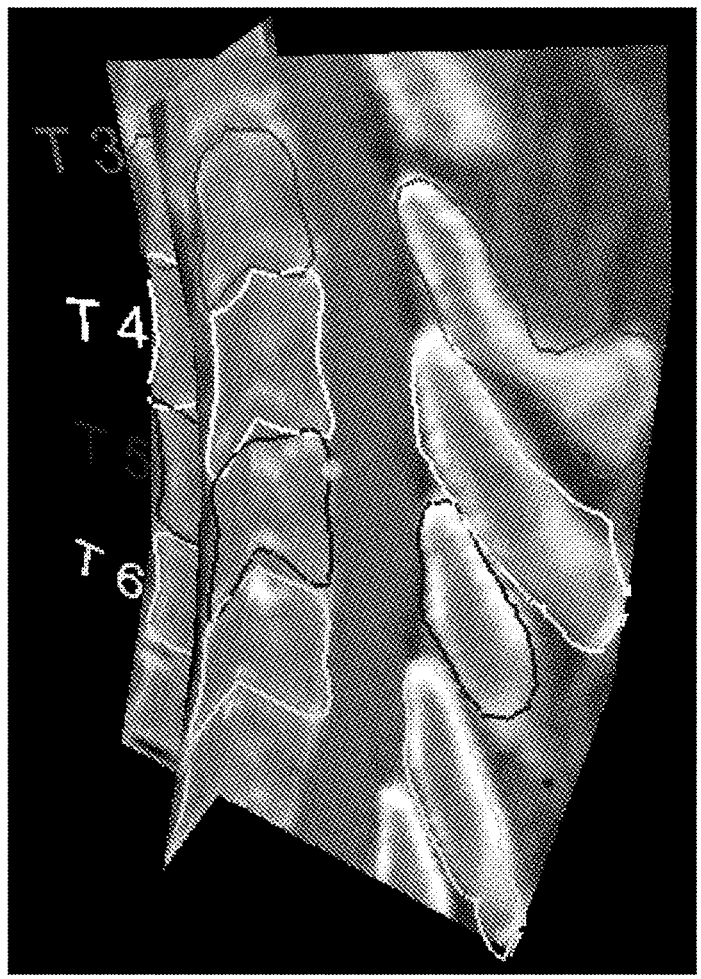
FIG. 3 shows an image of part of a spinal column with thoracic vertebrae T3, T4, T5, and T6, based on two cross section images.
Figure 4:
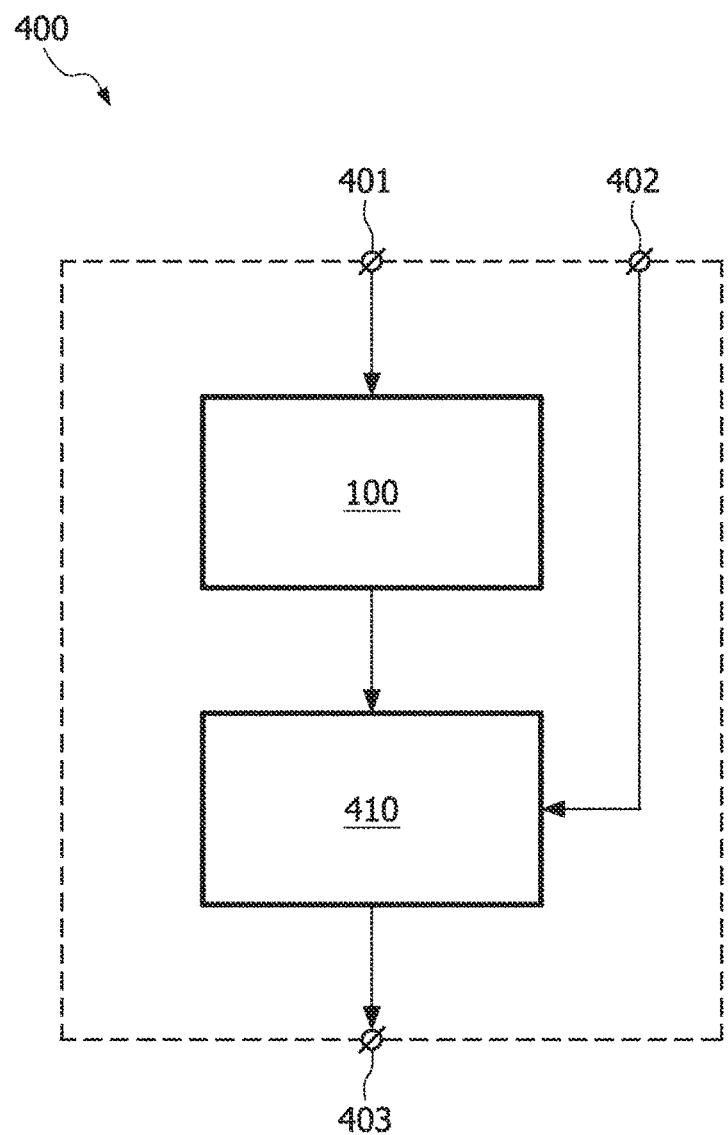
FIG. 4 schematically shows an exemplary embodiment of the reporting system.

FIG. 3 shows an image of a part of the spinal column with thoracic vertebrae T3, T4, T5, and T6. The image is based on two cross section images defined by the first and the second cross-section surface determined as described with reference to FIG. 2.

For rendering the image intensities, a variety of standard rendering methods can be used, such as ray-casting, pixel splatting or texture mapping. In the images shown in FIG. 3, the texture mapping was used in the following way:

firstly, the rendering geometry is represented as a triangulated surface;

next, the image intensity values that correspond to the surface of each individual triangle are collected in a 2D image (the so-called texture image); and finally, the rendering engine (e.g. as part of the graphics-card, or a software openGL renderer) is provided with the triangle geometry and the respective texture images.

The skilled person will understand that the system can be useful for displaying views of planar or curvilinear cuts through various anatomical structures such as, but not limited to, the heart, blood vessels and brain.

Advantageously, the system 100 may be comprised in a reporting system 400. Thus, views computed by the visualization unit 130 of the system 100 may be included in a medical report created by a report unit 410 together with annotations by a physician examining the image data. In an embodiment, the reporting system 400 comprises a reporting system first input connector 401 for obtaining data for the system 100 and a reporting system second input connector 402 for obtaining other data such as user annotations, patient name and age, other test and examination results, comments by a physician preparing the report, and so on. The reporting unit 410 is arranged to receive the image computed by the visualization unit 130 of the system 100 and the other data from the second input 402 for preparing a report. The report is output via a reporting system output connector 403.

Those skilled in the art will further understand that other embodiments of the system 100 are also possible. It is possible, among other things, to redefine the units of the system and to redistribute their functions. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 5:
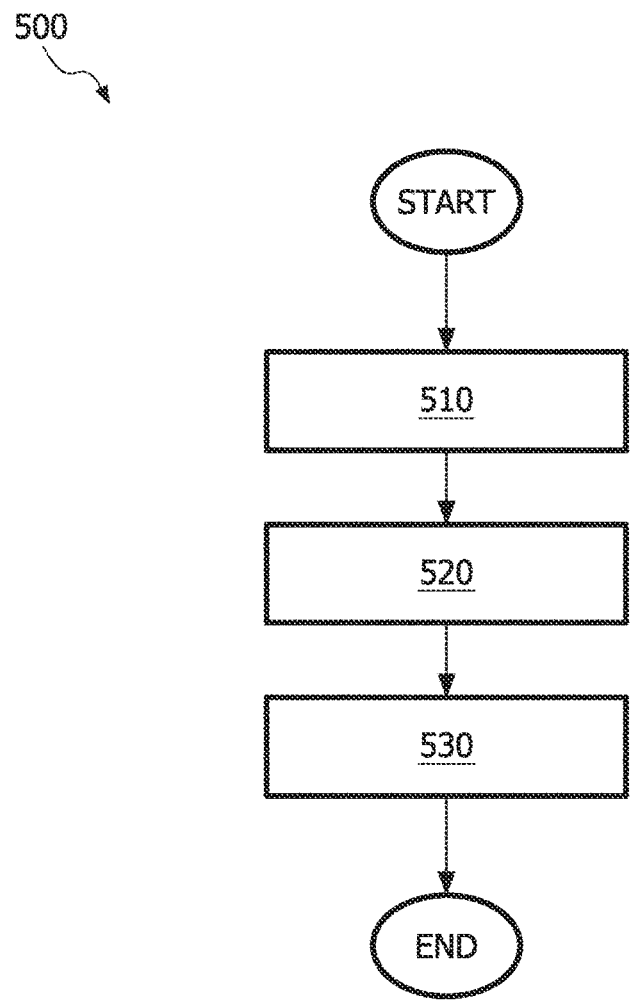
FIG. 5 shows a flowchart of an exemplary implementation of the method.

FIG. 5 shows a flowchart of an exemplary implementation of the method 500 of visualizing an object in image data using a first cross-section surface coupled to a model of the object. The method 500 begins with a model step 510 for adapting the model to the object in the image data. After the model step 510, the method continues to a surface step 520 for adapting the first cross-section surface to the adapted model on the basis of the coupling between the first cross-section surface and the model. After the surface step 520, the method continues to a visualization step 530 for computing an image from the image data on the basis of the adapted first cross-section surface. After the visualization step 530, the method 500 terminates.

A person skilled in the art may change the order of some steps or perform some steps concurrently using threading models, multi-processor systems or multiple processes without departing from the concept as intended by the present invention. Optionally, two or more steps of the method of the current invention may be combined into one step. For example, the model step 510 and the surface step 520 may be combined into one adaptation step comprising a plurality of partial adaptation steps wherein each partial adaptation step is arranged for adapting the model to the object in the image data followed by adapting the first cross-section surface to the model, until a predetermined condition is fulfilled, e.g., until the number of partial adaptation steps is equal to a predetermined number. Optionally, a step of the method of the current invention may be split into a plurality of steps.

Figure 6:
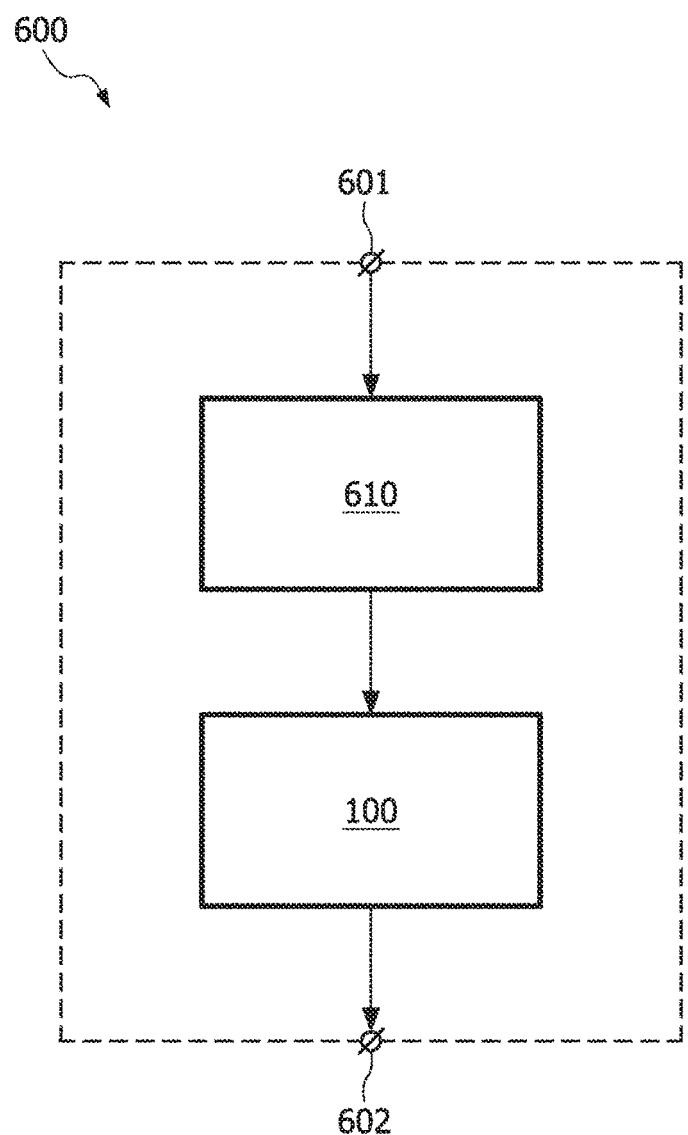
FIG. 6 schematically shows an exemplary embodiment of the image acquisition apparatus.

FIG. 6 schematically shows an exemplary embodiment of the image acquisition apparatus 600 employing the system 100, said image acquisition apparatus 600 comprising a CT image acquisition unit 610 connected via an internal connection with the system 100 an input connector 601, and an output connector 602. This arrangement advantageously increases the capabilities of the image acquisition apparatus 600, providing said image acquisition apparatus 600 with advantageous capabilities of the system 100.

Figure 7:
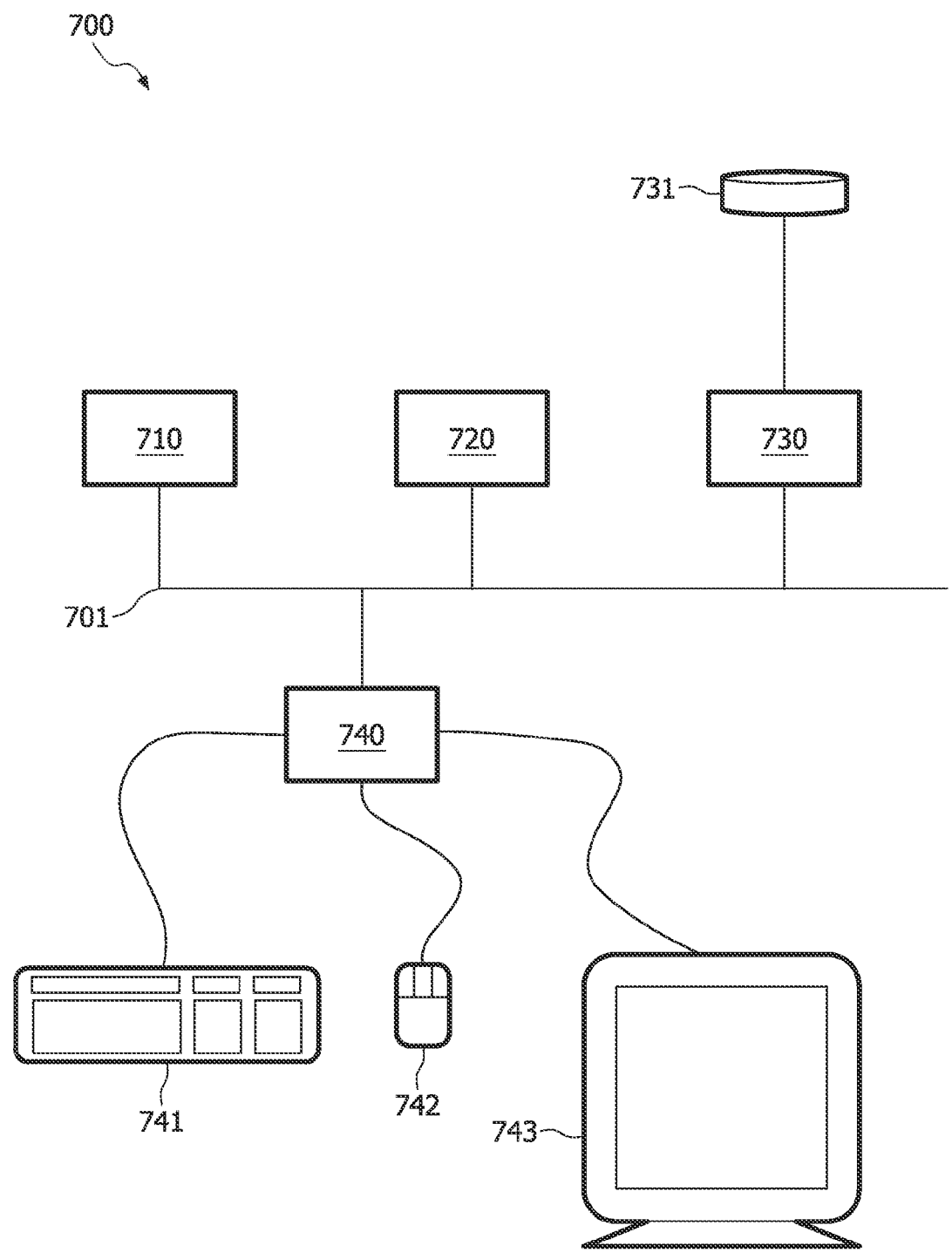
FIG. 7 schematically shows an exemplary embodiment of the workstation.

FIG. 7 schematically shows an exemplary embodiment of the workstation 700. The workstation comprises a system bus 701. A processor 710, a memory 720, a disk input/output (I/O) adapter 730, and a user interface (UI) 740 are operatively connected to the system bus 701. A disk storage device 731 is operatively coupled to the disk I/O adapter 730. A keyboard 741, a mouse 742, and a display 743 are operatively coupled to the UI 740. The system 100 of the invention, implemented as a computer program, is stored in the disk storage device 731. The workstation 700 is arranged to load the program and input data into memory 720 and execute the program on the processor 710. The user can input information to the workstation 700, using the keyboard 741 and/or the mouse 742. The workstation is arranged to output information to the display device 743 and/or to the disk 731. A person skilled in the art will understand that there are numerous other embodiments of the workstation 700 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second, third, etc., does not indicate any ordering. These words are to be interpreted as names.

The invention claimed is:

1. A system for visualizing an object in image data using a first curvilinear cross-section surface coupled to an anatomical structure model of the object, the system comprising:
   a model unit, executed by a microprocessor, that adapts the anatomical structure model to the object in the image data;
   a surface unit, executed by the microprocessor, that adapts the first curvilinear cross-section surface to the adapted anatomical structure model based on the coupling between the first curvilinear cross-section surface and the anatomical structure model, wherein the surface unit further adapts a second curvilinear cross-section surface to the anatomical structure model of the object based on the coupling between the second curvilinear cross-section surface and the anatomical structure model, wherein the surface unit further adapts a third curvilinear cross-section surface that is perpendicular to the first curvilinear cross-section surface to the anatomical structure model of the object, wherein the third curvilinear cross-section surface is elastically coupled to first, second, third, fourth and fifth control points, wherein the first control point and the second control point are located at a tip of a respective first and second transverse process, wherein the third control point is located on a right pedicle and the fourth control point is located on a left pedicle, wherein the fifth control point is located on a vertebral foramen; and a visualization unit, executed by the microprocessor, that computes an image from the image data based on the adapted first curvilinear cross-section surface, the adapted second curvilinear cross-section surface, and the adapted third curvilinear cross-section surface.

2. The system as claimed in claim 1, wherein the first curvilinear cross-section surface is rigid and is movably coupled to the anatomical structure model.

3. The system as claimed in claim 1, wherein the first curvilinear cross-section surface is elastic.

4. The system as claimed in claim 1, wherein the first curvilinear cross-section surface comprises a plurality of control points which are elastically coupled to the model.

5. A reporting system for creating a report, the reporting system comprising the system according to claim 1, the report comprising the image computed by the visualization unit.

6. An image acquisition apparatus comprising the system as claimed in claim 1.

7. A workstation comprising the system as claimed in claim 1.

8. The system as claimed in claim 1, wherein the first curvilinear cross-section surface is elastic and a symmetry plane of a spinal column.

9. A method of visualizing an object in image data using a first curvilinear cross-section surface coupled to an anatomical structure model of the object, the method comprising:

a model step that adapts the anatomical structure model to the object in the image data;

a surface step that adapts the first curvilinear cross-section surface to the adapted anatomical structure model based on the coupling between the first curvilinear cross-section surface and the anatomical structure model;

adapting a second curvilinear cross-section surface to the anatomical structure model of the object based on the coupling between the second curvilinear cross-section surface and the anatomical structure model;

adapting a third curvilinear cross-section surface that is perpendicular to the first curvilinear cross-section surface to the anatomical structure model of the object, wherein the third curvilinear cross-section surface is elastically coupled to first, second, third, fourth and fifth control points, wherein the first control point and the second control point are located at a tip of a respective first and second transverse process, wherein the third control point is located on a right pedicle and the fourth control point is located on a left pedicle, wherein the fifth control point is located on a vertebral foramen; and a visualization step that computes, by a microprocessor, an image from the image data based on the adapted first curvilinear cross-section surface, the adapted second curvilinear cross-section surface, and the adapted third curvilinear cross-section surface.

10. The method as claimed in claim 9, wherein the first curvilinear cross-section surface comprises a plurality of control points which are elastically coupled to the model.

11. A memory of a computer arrangement loaded with a computer program comprising instructions for visualizing an object in image data using a first curvilinear cross-section surface coupled to an anatomical structure model of the object, the computer arrangement comprising a processing unit and the memory, wherein the computer program when executed by the processing unit causes the processing unit to:

adapt the anatomical structure model to the object in the image data;

adapt the first curvilinear cross-section surface to the adapted anatomical structure model based on the coupling between the first curvilinear cross-section surface and the anatomical structure model;

adapt a second curvilinear cross-section surface to the anatomical structure model of the object based on the coupling between the second curvilinear cross-section surface and the anatomical structure model;

adapt a third curvilinear cross-section surface that is perpendicular to the first curvilinear cross-section surface to the anatomical structure model of the object, wherein the third curvilinear cross-section surface is elastically coupled to first, second, third, fourth and fifth control points, wherein the first control point and the second control point are located at a tip of a respective first and second transverse process, wherein the third control point is located on a right pedicle and the fourth control point is located on a left pedicle, wherein the fifth control point is located on a vertebral foramen; and compute an image from the image data based on the adapted first curvilinear cross-section surface, the adapted second curvilinear cross-section surface, and the adapted third curvilinear cross-section surface.

12. The method as claimed in claim 9, wherein the first curvilinear cross-section surface is elastic and a symmetry plane of a spinal column.

* * * * *